United States Patent
Kolam

(10) Patent No.: US 10,009,439 B1
(45) Date of Patent: Jun. 26, 2018

(54) CACHE PRELOADING

(71) Applicant: Instart Logic, Inc., Mountain View, CA (US)

(72) Inventor: Hariharan Kolam, Palo Alto, CA (US)

(73) Assignee: Instart Logic, Inc., Palo Alto, CA (US)

( * ) Notice: Subject to any disclaimer, the term of this patent is extended or adjusted under 35 U.S.C. 154(b) by 499 days.

(21) Appl. No.: 14/098,453

(22) Filed: Dec. 5, 2013

(51) Int. Cl.
*G06F 15/167* (2006.01)
*H04L 29/08* (2006.01)
*H04L 29/06* (2006.01)
*H04L 12/747* (2013.01)
*G06F 17/30* (2006.01)
*G06F 12/0862* (2016.01)

(52) U.S. Cl.
CPC ...... *H04L 67/2847* (2013.01); *H04L 67/2842* (2013.01); *H04L 67/2852* (2013.01); *H04L 67/42* (2013.01); *G06F 12/0862* (2013.01); *G06F 17/3028* (2013.01); *G06F 17/30076* (2013.01); *H04L 45/742* (2013.01)

(58) Field of Classification Search
CPC ............. G06F 17/30902; G06F 17/211; G06F 17/30905; G06F 17/30899; G06F 17/2247; G06F 17/30864; G06F 17/30011; G06F 17/30076; G06F 17/3028; G06F 12/0862; H04L 67/02; H04L 67/42; H04L 67/2847; H04L 67/2842; H04L 67/322; H04L 47/10; H04L 67/2852; H04L 45/742
USPC ........ 709/213, 203, 224, 219, 228; 715/238, 715/733, 234; 370/235
See application file for complete search history.

(56) References Cited

U.S. PATENT DOCUMENTS

| | | | |
|---|---|---|---|
| 9,037,975 B1 * | 5/2015 | Taylor | G06F 17/30905 715/733 |
| 2005/0080908 A1 * | 4/2005 | Allen | G06F 17/30864 709/228 |
| 2006/0294223 A1 * | 12/2006 | Glasgow | H04L 67/2847 709/224 |
| 2009/0063622 A1 * | 3/2009 | Cheng | G06F 17/30899 709/203 |
| 2009/0109849 A1 * | 4/2009 | Wood | H04L 47/10 370/235 |
| 2013/0226992 A1 * | 8/2013 | Bapst | G06F 17/30902 709/203 |
| 2013/0326022 A1 * | 12/2013 | Ehrlich | G06F 17/30902 709/219 |
| 2014/0201615 A1 * | 7/2014 | Rajkumar | G06F 17/30011 715/234 |
| 2014/0331117 A1 * | 11/2014 | Liu | G06F 17/30902 715/234 |
| 2015/0095768 A1 * | 4/2015 | Rimmer | G06F 17/211 715/238 |
| 2015/0143224 A1 * | 5/2015 | Kennedy | G06F 17/2247 715/234 |
| 2015/0200994 A1 * | 7/2015 | Jain | H04L 67/02 709/219 |

* cited by examiner

*Primary Examiner* — Jungwon Chang
(74) *Attorney, Agent, or Firm* — Van Pelt, Yi & James LLP

(57) ABSTRACT

Preloading a cache is disclosed. A requested web content is received. A priority order associated with one or more resources of the requested web content is determined. The cache of an application is preloaded with one or more resources of the requested web content in a loading order based at least in part on the determined priority order.

20 Claims, 9 Drawing Sheets

200

```
<html>
   <head>
     <title>Welcome</title>
   </head>
   <body>
     <h1>HelloWorld </h1>
              .
              .
              .
     <img src = "url for image"/>
     <video>
        <source src = "url for video" type = "video/ogg"  />
     </video>
     <script type = "text/javascript">
     <!--script
     *** Some javascript code is placed here ***
     -- >
     </script>

</body>
</html>
```

Script

```
|-> Document
    |-> Element (<html>)
        |-> Element (<body>)
            |-> Element (<div>)
                |-> text node
                |-> Anchor
                    |-> text node
            |-> Form
                |-> Text-box
                |-> Text Area
                |-> Radio Button
                |-> Check Box
                |-> Select
                |-> Button
```

FIG. 3

CACHE PRELOADING

BACKGROUND OF THE INVENTION

Typically, a web browser needs to receive the dependent resources associated with different links and URLs before it can complete the rendering of a webpage. The startup wait time experienced by an end-user of a browsing session may be insignificant in low-latency networks, such as wired Ethernet networks, but unacceptably long for an end-user in higher-latency networks, such as cellular 3G networks. Additionally, processing time required to generate and provide web content adds to the wait time. Therefore, improved techniques for delivering information corresponding to a webpage would be desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

FIG. 3 is a diagram illustrating an embodiment of a DOM tree 300.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Loading a cache is disclosed. A web browser often needs to receive dependent resources included in a webpage before it can complete the rendering of the webpage. In some embodiments, a priority order associated with one or more resources of the webpage is determined. For example, the ordering in which resources should be obtained is determined based at least in part on one or more of the following: an order of resources requested in the webpage, an observed order of resources added in a Document Object Model (i.e., DOM), sizes of the resources, visual importance of the resources, utilization frequencies of the resources, etc. In some embodiments, a cache of an application (e.g., browser, mobile application, etc.) is preloaded with the one or more resources of the webpage in a loading order based at least in part on the determined priority order.

Figure 1:
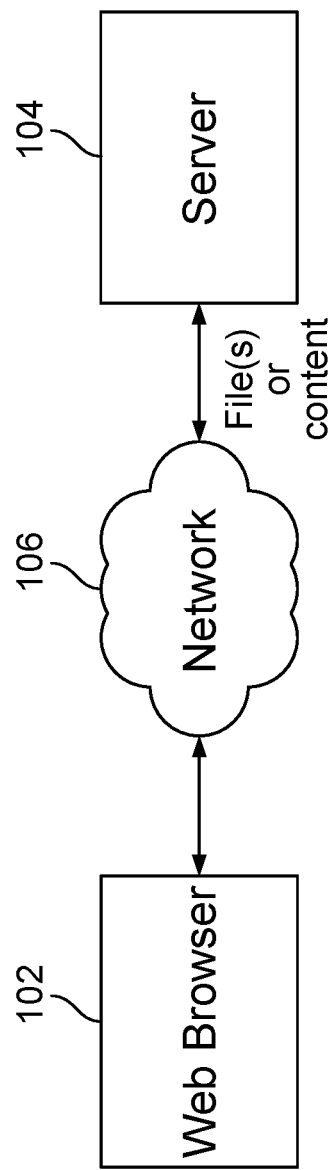
FIG. 1 is a block diagram illustrating an embodiment of a web browser accessing webpages and other information through a network.

FIG. 1 is a block diagram illustrating an embodiment of a web browser accessing webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components and resources of the webpage in a local memory.

The Document Object Model (DOM) is a standardized model supported by different web browsers, e.g., Internet Explorer, Firefox, and Google Chrome, to represent the various components of a webpage. The DOM is a crossplatform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard includes different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document.

The DOM standard represents documents as a hierarchy of node objects, called a DOM tree. Some types of nodes may have child nodes of various types, and others are leaf nodes that cannot have any object below them in the document structure hierarchy.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components and resources of webpage 200 in a local memory. For example, when the image tag (shown as <img src="url for image"/> in FIG. 2) is parsed by web browser 102, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 200 redirects web browser 102 to fetch an image file from a uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by Javascript. In response to the request, the requested dependent resource is sent to web browser 102 via a network.

For example, if the nodes of the DOM tree include N different links and/or URLs, N separate GET requests (e.g., N separate HTTP GET requests) are sent via a network requesting the dependent resources to be sent to web browser 102. In response, N separate GET responses (e.g., N separate HTTP GET responses) are sent to web browser 102, delivering the dependent resources to web browser 102.

The round trip time or network response time for a GET request to arrive at an edge server and for its corresponding GET response to arrive at web browser 102 is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the network may vary depending on its network type(s).

Some networks have relatively lower network latency. For example, the network latency associated with WANs or Wi-Fi networks is relatively low, e.g., on the order of 10 milliseconds. Suppose the number of links and/or URLs included in the DOM tree, N, is equal to twenty. The total network latency associated with receiving the dependent resources associated with the twenty links and/or URLs from the edge server, then, is approximately 200 milliseconds. To improve network performance, present day browsers have become more efficient in reusing connections to the same server, such that typically less than 20% of the connections may be fresh connections.

Some networks have relatively higher network latency. For example, the network latency associated with a $3^{rd}$ generation mobile telecommunications (3G) network is relatively high, e.g., on the order of 100 milliseconds. In this instance, the total network latency associated with receiving the dependent resources associated with the twenty links and/or URLs from the edge server is then on the order of two seconds.

Since the network latency associated with different types of networks varies widely, and web browser 102 needs to receive the dependent resources associated with the links and URLs before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks. Therefore, improved techniques for delivering information corresponding to a webpage would be desirable.

Figure 4A:
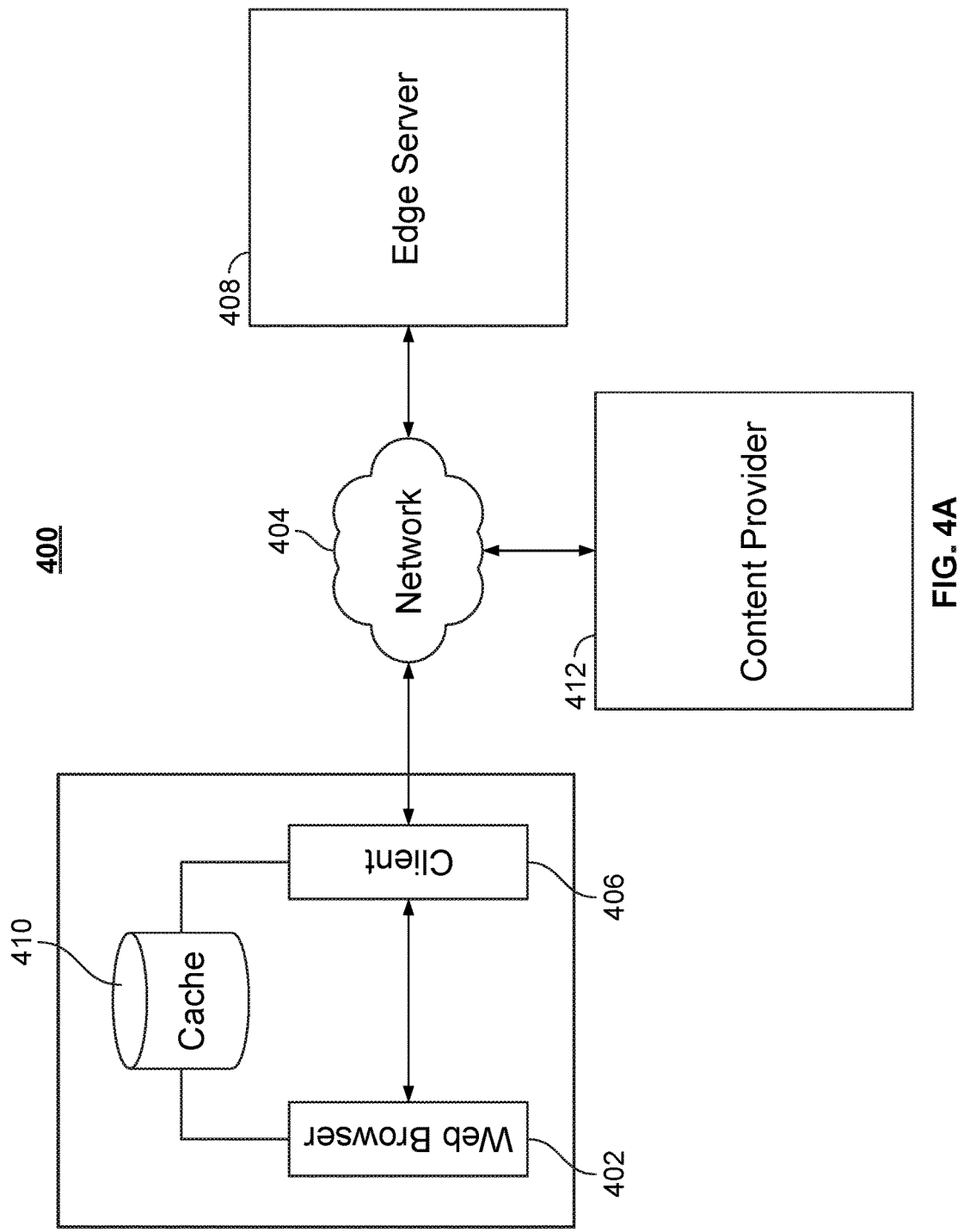
FIG. 4A is a block diagram illustrating an embodiment of an optimized content delivery environment.

FIG. 4A is a block diagram illustrating an embodiment of an optimized content delivery environment. Client-server system 400 may be utilized to virtualize a DOM of a web browser. Virtualization of a DOM of a web browser allows the client-server system to take control of the DOM for different kinds of optimizations, while keeping the virtualization transparent to the web browser. A web browser 402 accesses webpages and other information through a network 404. When web browser 402 sends network messages onto network 404 that are related to the downloading of webpages or other information and resources, the messages may be (1) intercepted and processed by client 406, (2) directly received and then processed by edge server 408 supporting virtualization, or (3) provided directly to a content provider such as content provider 412. In some embodiments, webpages or other information and resources related to the webpages that are sent to web browser 402 may be intercepted, filtered, processed, or provided by client 406 or edge server 408 (e.g., content from content provider 412 for web browser 402 is routed via client 406 and/or edge server 408).

In addition, method API calls by web browser 402 or any JavaScript code to manipulate the objects in a DOM tree may be intercepted, processed, or modified by client 406. Client 406 may also manipulate the DOM tree by making the appropriate method API calls to the DOM tree. As a result, client 406 and edge server 408 together create a virtualization engine for the DOM of web browser 402. The virtualization engine may access and manipulate a DOM tree, including the creation, deletion, or update of nodes within the DOM tree.

Virtualization of the DOM of web browser 402 may be applicable to different types of optimization. In some embodiments, using the virtualization engine, optimized delivery of information over a network by segmentation and reprioritization of downloaded information can be achieved. For example, using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage without compromising the end-user's experience.

In some embodiments, the virtualization of the DOM of web browser 402 is transparent to web browser 402. In some embodiments, the virtualization of the DOM of web browser 402 is also transparent to the end-users. The end-users are not required to install any plugins. In some embodiments, the virtualization of the DOM of web browser 402 is also transparent to the content publishers, without requiring the content publishers to change any codes.

In some embodiments, client 406 may be injected into web browser 402 based on standards-based (e.g., HTML or JavaScript) procedures. For example, after edge server 408 receives a request from web browser 402 requesting an HTML webpage file, server 408 may parse the HTML webpage file (e.g., obtained from content provider 412), inject client 406 into the HTML webpage file, and then send the response back to web browser 402. In some embodiments, client 406 may be injected into web browser 402 by a content provider directly. For example, web browser 402 requests an HTML webpage file directly from content provider 412 and content provider 412 provides the webpage file with code of injected client 406. Content provider 412 may be a content producer of the provided content. In some embodiments, client 406 may be injected by adding JavaScript client code in the head section of the HTML webpage file.

Virtualization of the DOM of web browser 402 may include handling static and dynamic interactions with the DOM of web browser 402. Both types of interactions may be intercepted or virtualized by the virtualization engine.

Dynamic interactions with the DOM of web browser 402 include interactions that are effected by JavaScript (e.g., Ajax). The DOM of web browser 402 is virtualized by having client 406 intercept and virtualize method API calls to create, delete, or update elements in the DOM. In some embodiments, only DOM core level 1 APIs, which are supported by all standardized web browsers, are intercepted and virtualized. The DOM core level 1 APIs for manipulating the DOM tree are supplanted by the equivalent JavaScript interfaces of the virtualization engine. In some embodiments, one or more resources requested using a dynamic request (e.g., request made via JavaScript) may be intercepted and handled by a client such as client 406 due to the client's ability to handle and intercept resource requests. For example, client 406 is able to reorder, prefetch, and/or provide a cached version of one or more resources of a webpage requested using a dynamic request.

Static interactions to the DOM of web browser 402 include interactions corresponding to static HTML tags in an HTML webpage file (e.g., the <img src="url for image"/> tag as shown in FIG. 2). An HTML tag redirects web browser 402 to fetch a dependent resource (e.g., an image file) from a URL. Because the static GET request is not made via a JavaScript, the static request is not intercepted by client 406. Instead, the static request is sent by web browser 402 in its native form and then routed over the network, e.g., by means of DNS resolution, to an edge server 408 supporting virtualization. In some embodiments, one or more resources requested using the static request may not be intercepted and handled by a client such as client 406 due to the client's inability to handle and intercept resource requests. For example, client 406 is unable to reorder, prefetch, and/or provide a cached version of one or more resources of a webpage requested using a static tag.

In some embodiments, edge server 408 may discern whether a GET request is sent by web browser 402 or client 406 using a signature-based scheme, thus enabling edge server 408 to handle the static case as mentioned above. For example, if a GET request was sent by client 406, the GET request would be stamped with a predetermined signature. Conversely, if the GET request was sent directly from web browser 402, as in the static case, the GET request would not be stamped with the predetermined signature.

In some embodiments, when a GET request is sent directly from web browser 402 in a static case, edge server 408 may send dummy content in response, causing web browser 402 to create a dummy node in the DOM tree. At the same time, edge server 408 may also notify client 406, e.g., by sending a JavaScript, that a dummy node has just been created in the DOM tree, thereby eliminating the need for client 406 to poll the DOM tree for any new dummy nodes added to the DOM tree. Client 406, being notified of the newly created dummy node in the DOM tree, may dynamically update the dummy node with the actual content by issuing one or more JavaScript requests to edge server 408. In response to the one or more requests, edge server 408 sends one or more JavaScript updates, which are then intercepted by client 406, which may then populate the dummy node with the actual image content.

Using the virtualization engine, optimized delivery of information over a network by segmentation and reprioritization of downloaded information can be achieved. Note that the delivery of different information to web browser 402 may be determined by the type of the information. For example, dependent resources such as images, audio clips, and videos may be delivered using different techniques that are optimized based on the type of resource. In some embodiments, the virtualization engine may selectively alter or modify the delivery of only certain types of information (e.g., images). Images are used hereinafter as an example of the various dependent resources that can be efficiently downloaded to web browser 402 by the virtualization engine. Note that the examples of downloading images are selected for illustration purposes only; accordingly, the present application is not limited to these specific examples only.

In some other techniques, a compressed image is encoded in a format such that the image file is divided into a series of scans. The first scan shows the image at a lower quality, and the following scans gradually improve the image quality. For example, an image in progressive JPEG format is compressed in multiple passes of progressively higher detail. The initial passes include lower frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the startup time experienced by the end-user. Nonetheless, upon a GET for an image, the entirety of the image is downloaded. In some instances, components of the webpage other than the image may have higher priority than the details of the progressively encoded image contained in the subsequent passes, and it would be advantageous to download these important components of the web page before the whole image. In some instances, it is preferable to deploy the bandwidth used to download the whole image than to instead download other important components of the webpage. However, such prioritization of webpage content is lost when the image is treated as a single binary content.

Therefore, in some embodiments, the startup wait time can be reduced by dividing a progressive JPEG image file (or other image files that are compressed in multiple passes of progressively higher detail) into a plurality of segments based on priorities, e.g., frequency. Having control of both ends of the communication in a client and server system, the lower frequency components of the image can be requested by client 406 and sent by edge server 408 first, and then the higher frequency components can be requested by client 406 and sent by server 408 dynamically to refresh and sharpen the image.

Since a webpage may include content retrieved by multiple GET requests, by dividing each GET request into a plurality of GET requests, the server transmit queue is reprioritized to transmit (and web browser 402 is reprioritized to render) the higher priority components of each of the GETs first. In particular, if one original GET request corresponds to a huge image, the impact of the huge image blocking all the other GET requests would be lessened. As a result, the latency of seeing the images from the other GET requests is reduced.

In some embodiments, the segment sizes (e.g., the percentages of the original image file) delivered to web browser 402 in response to the plurality of GET requests may be tuned dynamically based on network load, network bandwidth, or other specifics of a user's connection. For example, the size of the first segment may be only 10% of the total image on a high latency and low bandwidth connection, while the size of the first segment may be 90% of the total image on a low latency and high bandwidth connection.

In some embodiments, browser cache 410 stores content that can be utilized by browser 402 to render web content instead of obtaining the content via network 404. For example, if the desired content of browser 402 is locally stored in a cache of the machine running browser 402, it would be faster to obtain the content locally rather than via a network request. In some embodiments, one or more resources of a webpage/web content desired to be rendered by browser 402 are preloaded in browser cache 410 prior to the original code of the webpage/web content requesting the resource. Thus when the preloaded content is needed/requested by the original code, the requested content is already in the cache for immediate use rather than requiring a request to be made via a network for the requested content. In some embodiments, one or more resources of a webpage/web content to be preloaded are requested in an optimized order. Obtaining resources in a requested order of the original code of the webpage/web content may not be optimal for rendering the webpage/web content as soon as possible. Often a web browser is limited by a limitation on a maximum number of concurrent connections to a single server. For example, web browser 402 is allowed to maintain up to four connections per server and when web browser 402 needs to obtain more than four resources from a single server, the additional requests for resources from the server must be queued. However, the ordering in which resources are requested affects the total amount of time required to obtain all the resources. In some embodiments, the ordering in which resources should be obtained is reordered and optimized based at least in part on one or more of the following: an order of resources requested in the webpage, an observed order of resources placed in a DOM, sizes of the resources, a maximum number of possible concurrent connections, a parameter/setting of the browser being utilized, a type of browser being utilized, visual importance of the resources, utilization frequencies of the resources, and other properties/information about the resources.

Figure 4B:
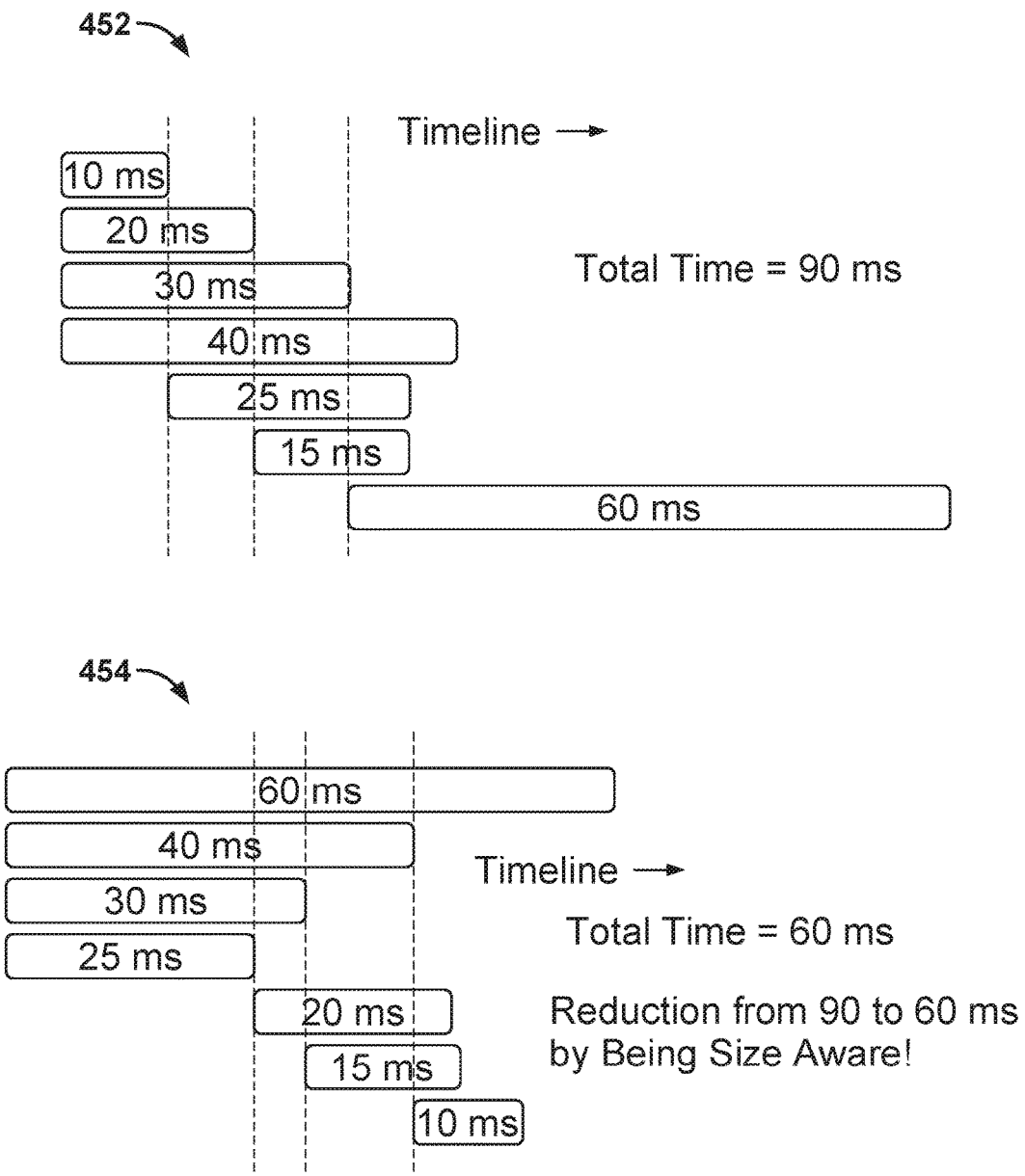
FIG. 4B is a diagram illustrating an example of downloading resources given a constraint on the maximum number of connections.

FIG. 4B is a diagram illustrating an example of downloading resources given a constraint on the maximum number of connections. Seven resources are being obtained from a single server by a web browser and the web browser is able to maintain a maximum of four connections. Diagram 452 shows that it would take a total of 90 ms to obtain the seven resources if the resources were requested and obtained in an order as originally requested in a webpage code. Diagram 454 shows that by reordering the request in an optimized order, the total amount of time to obtain the resources can be reduced to 60 ms.

Figure 5:
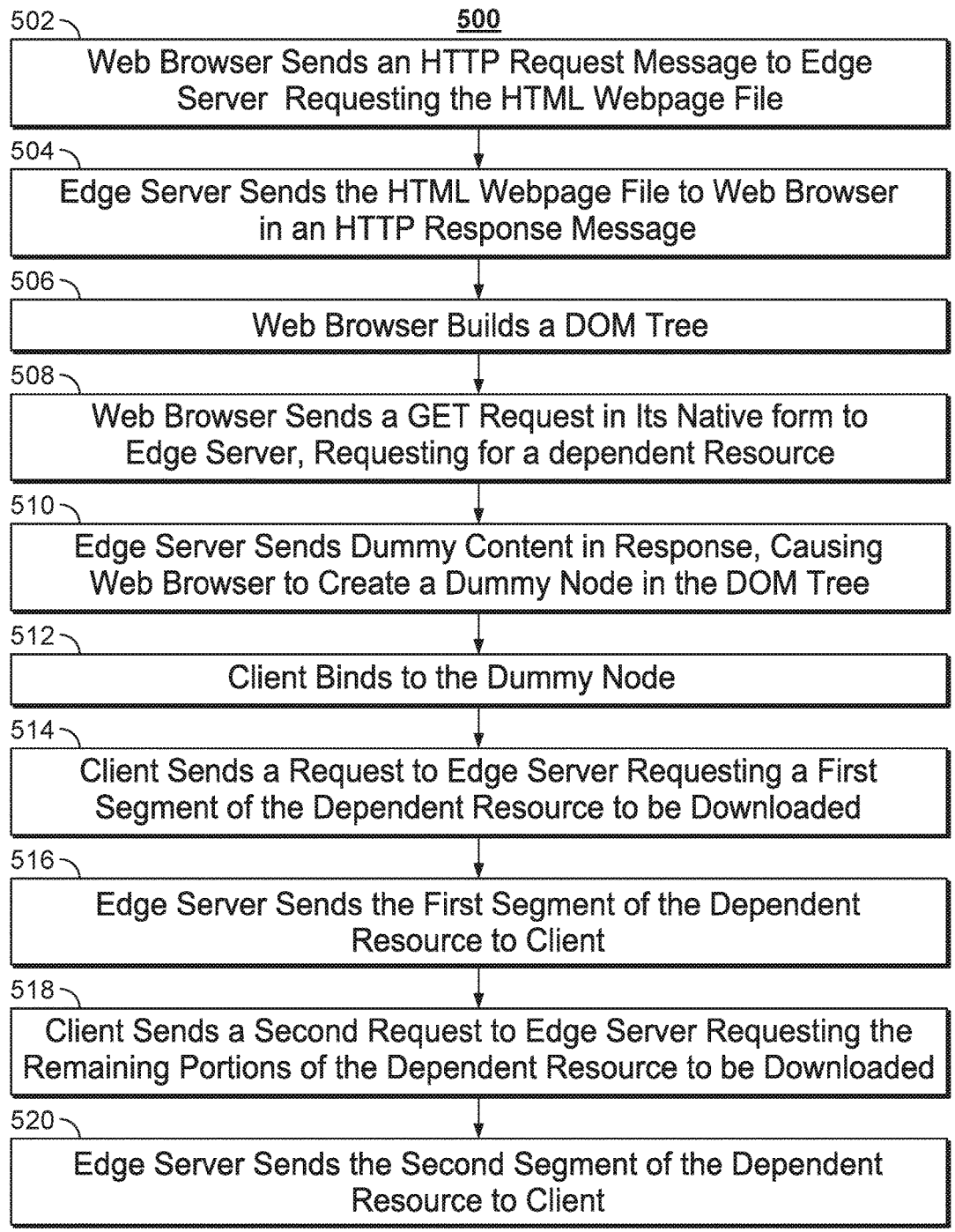
FIG. 5 is a diagram illustrating an embodiment of a flow diagram 500 for optimized delivery of a statically requested dependent resource associated with a webpage.

FIG. 5 is a diagram illustrating an embodiment of a flow diagram 500 for optimized delivery of a statically requested dependent resource associated with a webpage. Flow diagram 500 provides an example for the static case disclosed above. The steps shown in flow diagram 500 may be performed on web browser 402, client 406, and/or edge server 408.

With reference to FIG. 5, at 502, to display a webpage (e.g., webpage 200 as shown in FIG. 2), web browser 402 sends an HTTP request message to edge server 408 requesting the HTML webpage file corresponding to the webpage. After edge server 408 locates the requested HTML webpage file, edge server 408 parses the HTML webpage file, injects client 406 into the HTML webpage file, and then sends the HTML webpage file to web browser 402 in an HTTP response message at 504. Client 406 is then up and running. In some embodiments, rather than requesting the webpage from edge server 408, the webpage is directly requested from content provider 412 that has already injected code from client 406 in the HTML webpage file.

At 506, web browser 402 parses the HTML webpage file and builds a DOM tree to represent the various components of webpage 200 in a local memory. For example, when the image tag (shown as <img src="url for image"/> in FIG. 2) is parsed by web browser 402, the image is represented as an image object, and the image object is inserted into the DOM tree accordingly.

After the DOM tree is created, the DOM tree is traversed to retrieve any dependent resources indicated by any of the nodes in the DOM tree via a network. For example, the image object corresponding to the static image tag in webpage 200 redirects web browser 402 to fetch an image file from a URL. At 508, web browser 402 sends a GET request in its native form to edge server 408. Since the GET request is sent directly from web browser 402, the GET request is not stamped with any signature.

At 510, edge server 408 sends dummy content in response, causing web browser 402 to create a dummy node in the DOM tree. Edge server 408 also notifies client 406 that a dummy node corresponding to the dependent resource (e.g., image resource) has just been created in the DOM tree. At 512, client 406 binds to the dummy node. In various embodiments, sending the dummy content is optional. For example, rather than sending the dummy content, a first segment (e.g., the first segment sent in 516) of the content is provided. In some embodiments, the dummy content is sent along with the first segment of the content.

At 514, client 406 sends a request to edge server 408 requesting a first segment of the dependent resource (e.g., image file) to be downloaded. Note that the underlying communication protocol utilized between client 406 and edge server 408 can be any one of many protocols, including proprietary protocols or standards-based protocols such as HTTP. In some embodiments, the request message sent by client 406 may include different information, including the URL of the dependent resource, the dimensions of the image, and the like. In some embodiments, the request message may also include an indication of how the image should be segmented. For example, the request message may specify a percentage (e.g., 70%) of the total size of the dependent resource to be downloaded. In some embodiments, edge server 408 determines a percentage of the total size of the dependent resource to be downloaded based on network conditions and the like.

At 516, edge server 408 sends the first segment of the dependent resource to client 406. For example, the first segment may be the first scan of a progressive JPEG image, containing the lower frequency components of a progressive JPEG image. Client 406 then uses method API calls to refresh the dummy node in the DOM tree with the received image file, and the initial lower quality image can be rendered on the screen.

At 518, client 406 sends another request to edge server 408 requesting the remaining portions of the dependent resource to be downloaded. At 520, edge server 408 sends the remaining portions (e.g., the remaining 30%) of the dependent resource to client 406. For example, the second segment may be the second scan of a progressive JPEG image, containing the higher frequency components of the progressive JPEG image. Client 406 then uses method API calls to refresh the dependent resource node in the DOM tree with the received content (e.g., to allow a sharper and higher quality image to be rendered on the screen). Although process 500 described sending content in two portions, in various embodiments, the content may be divided and sent in any number of portions. For example, the dependent resource may be sent in three or more portions.

In some embodiments, the refreshing of the dependent resource node (e.g., image node) can be reprioritized based on user actions, user profiles, the statistical behavior of many users in accessing CDN content, or other network profiles.

In some embodiments, the refreshing of the dependent resource node (e.g., image node) can be reprioritized based on user actions. During a browsing session, a user may scroll to the bottom of a webpage before the webpage is loaded to completion. A user may also expand or minimize certain portions of the webpage. These and other user actions can be used to reprioritize the refreshing of the nodes in the DOM tree. For example, if it is detected that the user has scrolled to the bottom of a webpage, then client 406 may delay or disable the refreshing of an image node corresponding to an image that is no longer in the display zone.

In some embodiments, the refreshing of the dependent resource node (e.g., image node) can be reprioritized based on CDN content access statistics. For example, statistics may indicate that very few users choose to look at images on the bottom left corner of the webpage. In this case, client 406 may delay or disable the refreshing of the image nodes corresponding to those images.

Figure 6:
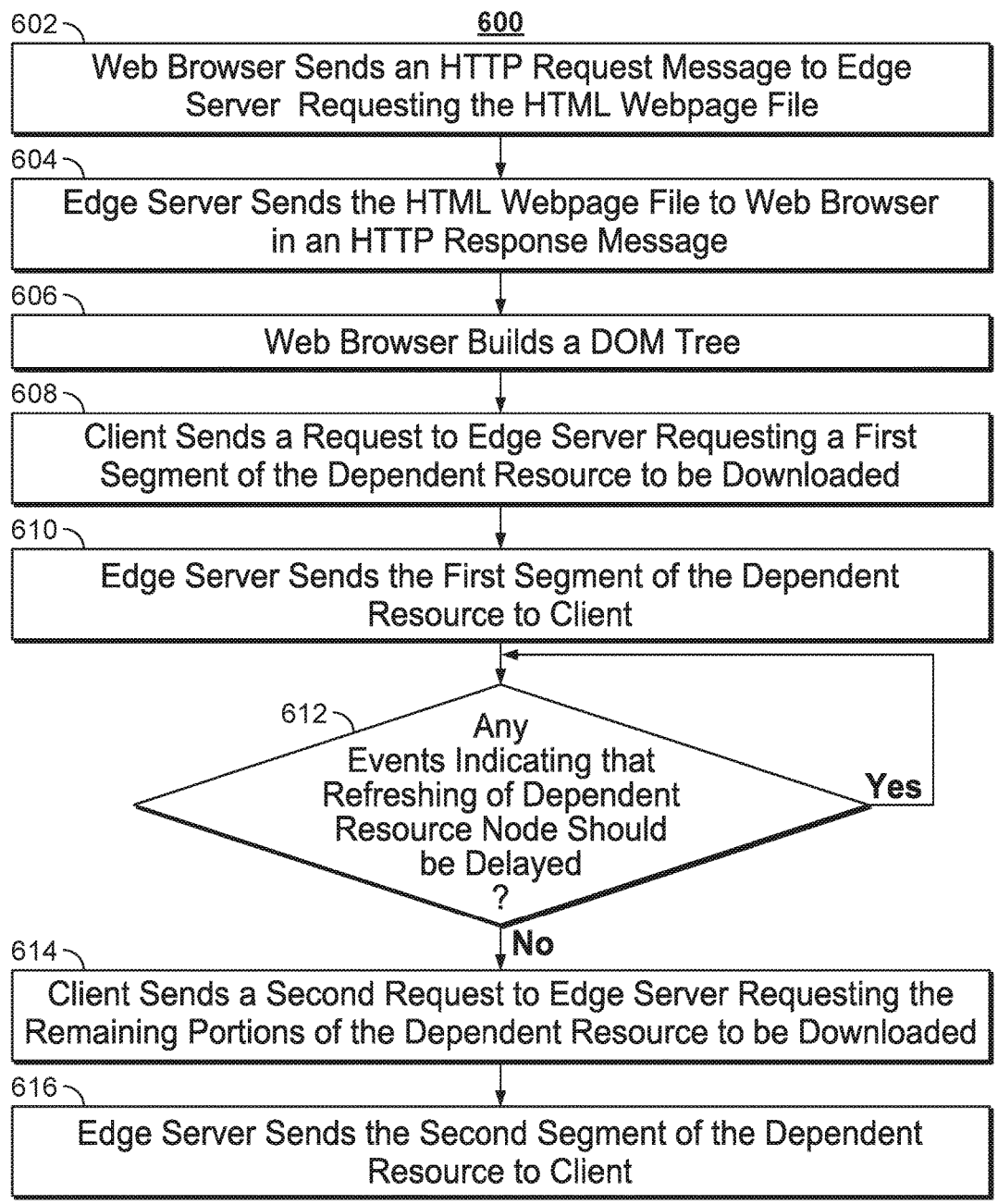
FIG. 6 is a diagram illustrating an embodiment of a flow diagram 600 for optimized delivery of a dynamically requested dependent resource associated with a webpage.

FIG. 6 is a diagram illustrating an embodiment of a flow diagram 600 for optimized delivery of a dynamically requested dependent resource associated with a webpage. Flow diagram 600 provides an example for the dynamic case disclosed earlier. The steps shown in flow diagram 600 may be performed using web browser 402, client 406, and/or edge server 408.

With reference to FIG. 6, at 602, to display a webpage (e.g., webpage 200, as shown in FIG. 2), web browser 402 sends an HTTP request message to edge server 408 requesting the HTML webpage file corresponding to the webpage. After edge server 408 locates the requested HTML webpage file, edge server 408 parses the HTML webpage file, injects client 406 into the HTML webpage file, and then sends the HTML webpage file to web browser 402 in an HTTP response message at 604. Client 406 is then up and running. In some embodiments, rather than requesting the webpage from edge server 408, the webpage is directly requested from content provider 412 that has already injected code implementing client 406 in the HTML webpage file.

At 606, web browser 402 parses the HTML webpage file and builds a DOM tree to represent the various components of webpage 200 in a local memory. When the script tag (as shown in FIG. 2) is parsed by web browser 402, a JavaScript is executed. JavaScript is one of many managed programming languages (e.g., runs in a Common Language Runtime) that may be utilized in various embodiments. If the JavaScript creates a dependent resource node, then the corresponding DOM core level 1 method API call(s) are intercepted by client 406 as part of the virtualization of the DOM, enabling client 406 to control the delivery of the content related to the node. The dependent resource node may include a collection or may at least in part include an element belonging to one or more collections.

At 608, client 406 sends a request to edge server 408 requesting a first segment of the dependent resource (e.g., image file) to be downloaded. Note that the underlying communication protocol utilized between client 406 and edge server 408 can be any one of many protocols, including proprietary protocols or standards-based protocols such as HTTP. In some embodiments, the request message sent by client 406 may include different information, including the URL of the image resource, the height and width of the image, and the like. In some embodiments, the request message may also include an indication of how the dependent resource should be segmented. For example, the request message may specify a percentage (e.g., 70%) of the total size of the dependent resource to be downloaded. In some embodiments, edge server 408 determines a percentage of the total size of the dependent resource to be downloaded based on network conditions, and the like.

At 610, edge server 408 sends the first segment of the dependent resource to client 406. For example, the first segment may be the first scan of a progressive JPEG image, including the lower frequency components of a progressive JPEG image. Client 406 then uses method API calls to refresh the dependent resource node in the DOM tree with the received image file (e.g., to allow the initial lower quality image to be rendered on the screen).

At 612, client 406 determines whether there are any events indicating that refreshing of the dependent resource node (e.g., image node) should be delayed or disabled. For example, the events checked by client 406 may be any event related to user actions, user profiles, statistical behavior of many users in accessing CDN content, or other network profiles as disclosed above.

If the event is not detected, then client 406 sends another request to edge server 408 requesting the remaining portions of the dependent resource to be downloaded, at 614. If the event is detected, step 612 is repeated after a predetermined and/or dynamically determined amount of time. At 616, edge server 408 sends the remaining portions (e.g., the remaining 30%) of the dependent resource to client 406. For example, the second segment may be the second scan of a progressive JPEG image, including the higher frequency components of the progressive JPEG image. Client 406 then uses method API calls to refresh the dependent resource (e.g., image node) in the DOM tree with the received image file (e.g., to allow a sharper and higher quality image to be rendered on the screen). Although process 600 described sending content in two portions, in various embodiments, the content may be divided and sent in any number of portions. For example, the dependent resource may be sent in three or more portions.

In some embodiments, client 406 may combine more than one GET request into a single GET request before sending to edge server 408, thereby reducing the overall round trip delays. In some embodiments, edge server 408 may convert a dependent resource from one format to another format (e.g., from PNG image to JPG plus an alpha channel image) before sending the dependent resource to client 406 for faster delivery through the network. Client 406 can convert the dependent resource back to the original format before use (e.g., before the image is rendered on the screen).

Figure 7:
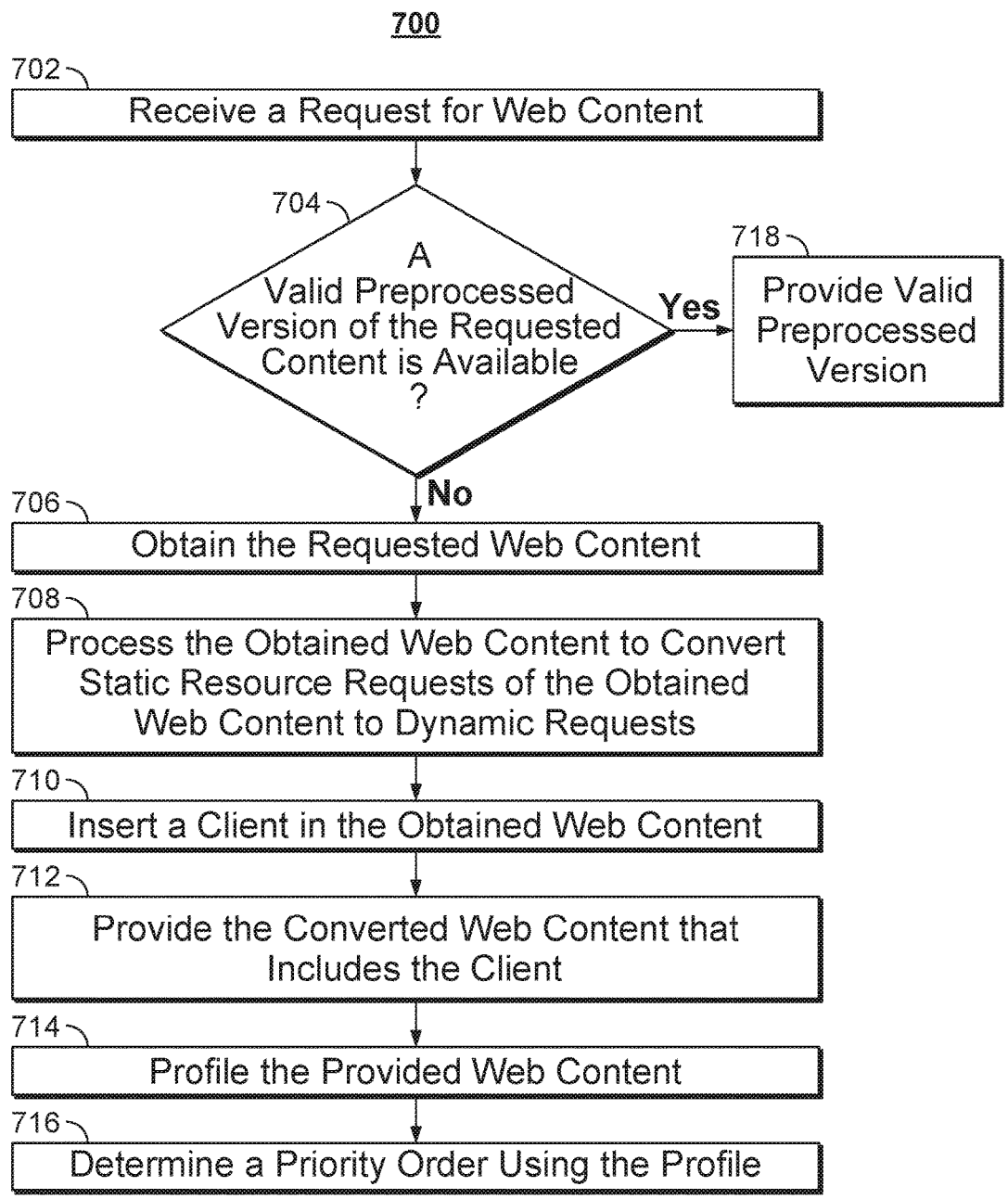
FIG. 7 is a diagram illustrating an embodiment of a flow diagram 700 for analyzing web content for optimization.

FIG. 7 is a diagram illustrating an embodiment of a flow diagram 700 for analyzing web content for optimization. The steps shown in flow diagram 700 may be performed using edge server 408.

At 702, a request for web content is received. For example, the request for a webpage is received from 502 of FIGS. 5 and/or 602 of FIG. 6. Examples of the web content include a webpage, a streaming content, a web application, and any other content accessible via the Internet. In some embodiments, the request includes an identifier and/or address (e.g., uniform resource locator) of the web content desired.

At 704, it is determined whether a valid preprocessed version of the requested content is available. For example, it is determined whether the content had been previously requested and processed to optimize delivery and caching of the resources referenced by the web content. In some embodiments, determining whether the valid preprocessed version exists includes whether the preprocessed version is stored in a storage of a server (e.g., storage of edge server 408 of FIG. 4A). In some embodiments, determining whether the valid preprocessed version exists includes determining whether a previously processed version of the requested content is valid. For example, the previously processed version of the requested content may have been updated since a previous processing. In some embodiments, a preprocessed version of the requested content is not valid if a predetermined amount of time has passed since when the preprocessed version has been processed.

If at 704 it is determined that a valid preprocessed version of the requested content is not available, at 706, the requested web content is obtained. In some embodiments, obtaining the requested web content includes obtaining content that can be at least in part used to provide the requested web content. For example, edge server 408 receives the web content request from web browser 402 and edge server 408 requests and obtains at least a portion of the requested content from content provider 412 via network 404 of FIG. 4A. In some embodiments, the requested web content is received from a plurality of content providers/sources. In some embodiments, the requested web content is obtained by a proxy server.

At 708, the obtained web content is processed to convert static resource requests of the obtained web content to dynamic requests. In some embodiments, static resource requests are handled by a web browser directly and dynamic requests may be intercepted and handled by an injected client such as client 406 of FIG. 4A. By converting static requests to dynamic requests, resource requests may be intercepted to be analyzed and/or optimized by the injected client. For example, resource requests may be intercepted and analyzed to determine an optimum ordering the resources should be provided to be preloaded in a cache such as browser cache 410 of FIG. 4A. In some embodiments, processing the obtained web content includes modifying code and/or language included in the obtained web content. In some embodiments, processing the obtained web content includes modifying resource requesting HTML elements (e.g., HTML elements requesting data from a URL) of an HTML file included in the obtained web content to a corresponding resource requesting managed programming language code. The programming language code may be in any of a number of managed programming languages (e.g., runs in a Common Language Runtime) such as JavaScript, Java, .Net, etc. For example, static HTML requests for one or more resources included in an HTML webpage file of the obtained web content is replaced with corresponding JavaScript requests for the same resources.

At 710, a client is inserted in the obtained web content. A webpage file (e.g., HTML file) included in the obtained web content may be parsed and modified to insert code for the client. In some embodiments, inserting the client includes including code for client 406 of FIG. 4A in the obtained web content. For example, code for client 406 of FIG. 4A is inserted into a webpage file included in the obtained web content. The client may be coded in a managed programming language (e.g., runs in a Common Language Runtime) such as JavaScript, Java, .Net, etc. In some embodiments, the client may be injected by adding JavaScript client code in the head section of an HTML webpage file included in the web content.

In some embodiments, information and resources that are sent to a web browser that is running code of the client may be intercepted, filtered, processed, or provided by the client. For example, the client allows dynamic resource requests of the web browser to be intercepted, reordered, and provided via a browser cache. In addition, method API calls by the web browser or any JavaScript code to manipulate the objects in a DOM tree may be intercepted, processed, or modified by the client. The client may also manipulate the web browser's DOM tree by making the appropriate method API calls to the DOM tree. As a result, the client may be a part of a virtualization engine for the DOM of the web browser. The virtualization engine may access and manipulate a DOM tree, including the creation, deletion, or update of nodes within the DOM tree.

In some embodiments, the converted web content that includes the client may be stored in storage to be provided to a future requestor. For example, the converted web content that includes the client is stored as a preprocessed version of the obtained web content and if the web content is subsequently requested, it is verified in 704 for its validity to be potentially provided at 718.

At 712, the converted web content that includes the client is provided. In some embodiments, the processed version of the obtained web content is provided to the requestor of the request received in 702. In some embodiments, the provided web content is received in 604 of FIGS. 6 and/or 504 of FIG. 5.

At 714, the provided web content is profiled. In some embodiments, the provided web content is profiled to determine a priority order associated with the obtained web content. In some embodiments, the provided web content is provided to a web browser and the web browser processes the provided web content for rendering/presentation. In some embodiments, the receiver of the provided web content requests one or more dependent resources of the provided web content (e.g., requested in 608 of FIG. 6). For example, requests for dependent resources of a webpage traditionally requested by a web browser to render the webpage are received. The requests for dependent resources (e.g., dynamic resource requests converted in 708 and other dynamic requests already included in the web content code) may be requests that are intercepted by the client included in 710 and provided by the client to a server such as edge server 408 of FIG. 4A. In some embodiments, the requested resource is obtained from a storage and/or obtained via a network from a content provider and provided to the requestor. For example, the requested dependent resource is provided by edge server 408 from a storage/cache of edge server 408 and/or from a copy obtained by edge server 408 via network 404. In some embodiments, only a portion of the requested resource may be provided. For example, the requested resource is provided in segments (e.g., sent in 610 and 616 of FIG. 6).

In some embodiments, the order in which resources of the provided web content is requested is tracked. In some embodiments, the sizes of resources requested by the web content are tracked. In some embodiments, the client included in 710 tracks when the requested resources are utilized (e.g., when a resource is added to the DOM associated with the web content) and provides the tracked information. In some embodiments, the visual importances of the resources (e.g., amount of screen/visual space utilized by resources) are tracked. In some embodiments, the utilization frequencies of the resources are tracked. In some embodiments, various tracked and profiled information of the web content is stored.

At 716, a priority order is determined using the profile. In some embodiments, various tracked and profiled information of the web content is utilized to determine a priority order associated with one or more dependent resources of the web content. For example, at least a portion of the order in which one or more resources of the web content should be preloaded in a web browser cache is determined using the tracked/profiled information. The determined priority order may be specific to specific web content. In some embodiments, the priority order may be specific to a maximum number of possible concurrent connections and/or a type/parameter/setting of the browser being utilized. The profile information may be associated with provided web content and stored in a storage. For example, the client included in 710 requests the profile information to determine an order resources should be requested/cached for the obtained web content.

If at 704, it is determined that a valid preprocessed version of the requested content is available, at 718, the valid preprocessed version of the requested content is provided to the requestor of the request in 702. In some embodiments, the valid preprocessed version of the requested content is a version that has been converted in 708 and modified to include the client in 710. In some embodiments, the valid preprocessed version is provided along with the associated profile information determined in 714. In some embodiments, the provided valid preprocessed version is received in 604 of FIG. 6 and/or 504 of FIG. 5.

Figure 8:
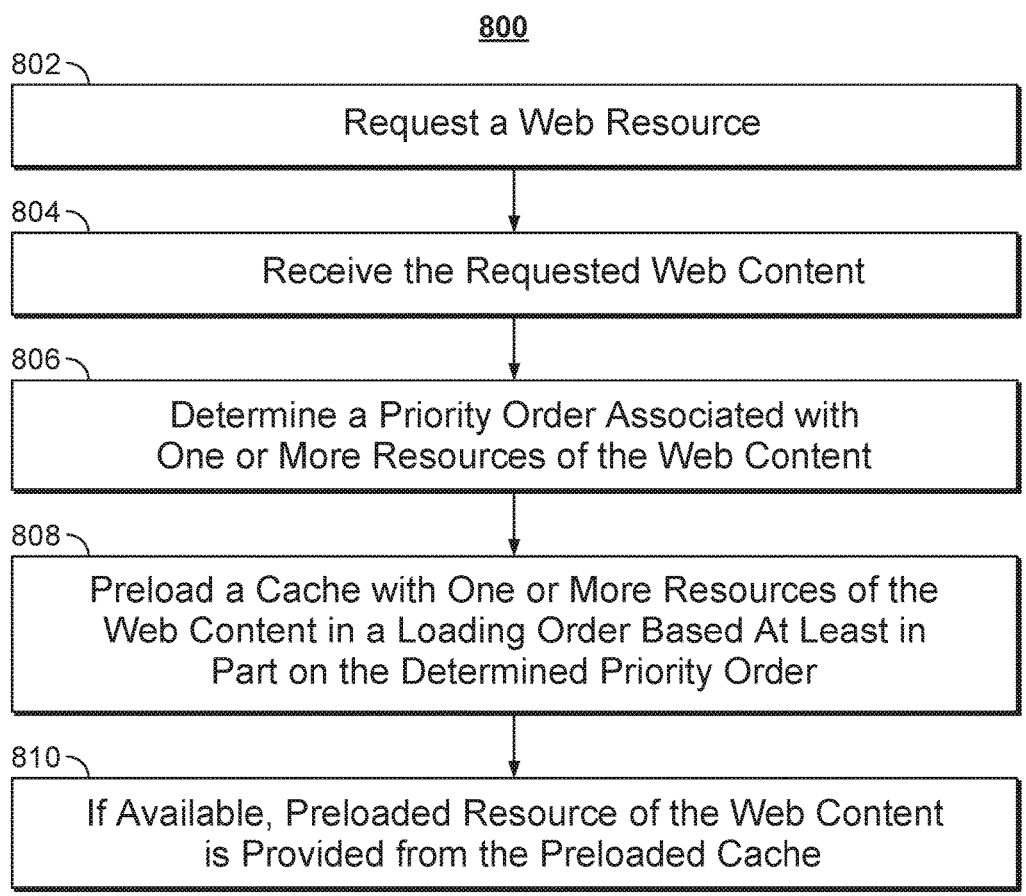
FIG. 8 is a flow chart illustrating an embodiment of a process for preloading a cache of a browser.

FIG. 8 is a flow chart illustrating an embodiment of a process for preloading a cache of a browser. The steps shown in process 800 of FIG. 8 may be performed using web browser 402 and/or client 406 of FIG. 4A.

At 802, a web resource is requested. In some embodiments, the web resource request is the request received in 702 of FIG. 7. In some embodiments, the web resource is requested directly from a web content provider. For example, web browser 402 of FIG. 4A requests the web resource from content provider 412 of FIG. 4A. Examples of the web content include a webpage, a streaming content, a web application, and any other content accessible via the Internet. In some embodiments, the request includes an identifier and/or address (e.g., uniform resource locator) of the web content desired.

At 804, the requested web content is received. In some embodiments, the received web content was provided in 712 or 718 of FIG. 7. For example, the web content has been converted in 708 and modified to include the client in 710 of FIG. 7. In some embodiments, the received web content was provided directly by a content provider and the received web content includes code for a client such as client 406 of FIG. 4A. For example, the content provider has modified a webpage file (e.g., HTML file) to insert code for the client. The client may be coded in a managed programming language (e.g., runs in a Common Language Runtime) such as JavaScript, Java, .Net, etc. In some embodiments, the client may be injected by the content provider by adding JavaScript client code in the head section of an HTML webpage file included in the received web content.

In some embodiments, information and resources that are sent to a web browser that is running code of the client may be intercepted, filtered, processed, or provided by the client. For example, the client allows dynamic resource requests of the web browser to be intercepted, reordered, and provided via a cache. In addition, method API calls by the web browser or any JavaScript code to manipulate the objects in a DOM tree may be intercepted, processed, or modified by the client. The client may also manipulate the web browser's DOM tree by making the appropriate method API calls to the DOM tree. As a result, the client may be a part of a virtualization engine for the DOM of the web browser. The virtualization engine may access and manipulate a DOM tree, including the creation, deletion, or update of nodes within the DOM tree.

At 806, a priority order associated with one or more resources of the web content is determined. Examples of the resources include images, videos, and other referenced web content to be rendered. In some embodiments, the resources are referenced by HTML elements (e.g., HTML elements requesting data from a URL). In some embodiments, static requests for resources by the web content have been converted to dynamic requests in 708 of FIG. 7. In some embodiments, static requests for resources by the web content have not been converted to dynamic requests because the web content was directly provided by a content provider (e.g., content provider 412 of FIG. 4A). In some embodiments, the determined priority order is associated with dynamic resource requests included in the web content and not associated with static resource requests included in the web content. In some embodiments, the web content was received along with associated priority order information. In some embodiments, the determined priority order was determined in 716 of FIG. 7. In some embodiments, the received web content is processed to be rendered and a client (e.g., client 406 of FIG. 4A) included in the web content is started. The client may request from a server (e.g., edge server 408) the priority order associated with the web content. The priority order may be specific to the specific web content. In some embodiments, the priority order was determined based at least in part on one or more of the following: the order in which resources of the web content are requested, the sizes of resources requested by the web content, ordering/when the requested resources are utilized (e.g., ordering/when a resource was added to the DOM), the visual importances of the resources (e.g., amounts of screen/visual spaces utilized by resources), the utilization frequencies of the resources, one or more properties/information about the resources, a maximum number of possible concurrent connections, and a type/parameter/setting of the browser being utilized. In some embodiments, the priority order is determined by profiling resource requests of the web content (e.g., in a similar manner of 714 of FIG. 7) for future use.

At 808, a cache is preloaded with one or more resources of the web content in a loading order based at least in part on the determined priority order. In some embodiments, the preloaded cache is a cache of an application (e.g., browser cache 410 of FIG. 4A, mobile application cache, operating system cache, etc.). In some embodiments, one or more dependent resources of the web content are loaded in a cache of a web browser in an ordering specified by the determined priority order. By loading the cache prior to the resource being requested in an optimized order, the web content may obtain the resource from the cache rather than requesting and waiting for the resource from a network. By preloading the cache, the web content may be rendered more efficiently/ faster. In some embodiments, an injected client of the web content handles the cache preloading. In some embodiments, if the priority order was not available in 806 (e.g., web content has not been profiled before), the cache is not preloaded. In some embodiments, preloading includes loading the cache before the resource is requested.

At 810, the preloaded resource of the web content, if available, is provided from the preloaded cache. For example, when a webpage included in the web content requests a resource, the resource is provided from the browser cache preloaded in 808 with the requested resource. In some embodiments, providing the preloaded resource includes intercepting a dynamic request for the resource (e.g., by a client injected in the web content) and providing the requested content from the cache.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of preloading a cache, comprising:
   receiving, by an edge server, a requested web content, wherein:
   the web content includes a replacement code for requesting one of a plurality of resources,
   the replacement code replaces an HTML element requesting a same one of the plurality of resources, and
   at least a portion of the requested web content is obtained from a content provider via a network;
   processing, by an edge server, the received web content to convert a static resource request of the received web content to a dynamic resource request, wherein the dynamic resource request is intercepted and optimized by an injected client to add the replacement code in the requested web content;
   determining, by the edge server, a priority order associated with a plurality of resources of the requested web content, wherein the priority order is determined based at least in part on: the optimized dynamic resource request, a size of each of the plurality of resources, and a maximum number of concurrent connections to the edge server allowed by an application; and
   preloading, by the edge server, the cache of the application with a plurality of resources referenced by the requested web content in a loading order specified by the determined priority order.

2. The method of claim 1, wherein the application is a web browser application.

3. The method of claim 1, wherein the requested web content is received from a content provider referenced by a URL utilized to request the requested web content.

4. The method of claim 1, wherein the requested web content is received from an intermediary server that obtained at least a portion of the requested web content using a URL of the requested web content.

5. The method of claim 1, wherein the loading order specifies an order in which the plurality of resources should be requested.

6. The method of claim 1, wherein determining the priority order includes receiving the priority order from a server that has predetermined the priority order for the requested web content.

7. The method of claim 1, wherein the priority order was determined based at least in part on an order the a plurality of resources are requested in a code of the web content.

8. The method of claim 1, wherein the priority order was determined based at least in part on an order the a plurality of resources are added to a Document Object Model of the web content.

9. The method of claim 1, wherein the priority order was determined based at least in part on information about the a plurality of resources.

10. The method of claim 1, wherein the priority order was determined based at least in part on relative amounts of visual space utilized by the plurality of resources.

11. The method of claim 1, wherein the priority order was determined based at least in part on a utilized frequency of each of the a plurality of resources.

12. The method of claim 11, wherein the utilized frequency of a resource is determined based at least on part on when the resource is added to a document object model (DOM) associated with the requested web content.

13. The method of claim 1, wherein the priority order was determined based at least in part by profiling the plurality of resources during a previous rendering of the web content.

14. The method of claim 1, wherein the loading order was determined based at least in part on a parameter of the application.

15. The method of claim 1, wherein the loading order was determined based at least in part on an identification of the application.

16. The method of claim 1, wherein the requested web content includes code for a client inserted after the web content was received from a content provider, and the client preloads the cache of the application.

17. The method of claim 16, wherein the client intercepts a request for one of the plurality of resources and provides the requested one resource from the cache.

18. The method of claim 1, wherein the loading order was determined based at least in part on a determined order in which to obtain the plurality of resources given the maximum number of concurrent connections allowed by the application, wherein a time to load the plurality of resources in the determined order is reduced compared with loading in an order different from the determined order.

19. A system for preloading a cache, comprising:
a communication interface configured to receive a requested web content from an edge server, wherein:
the web content includes a replacement code for requesting one of a plurality of resources,
the replacement code replaces an HTML element requesting a same one of the plurality of resources, and
at least a portion of the requested web content is obtained from a content provider via a network; and
a processor in the edge server, wherein the processor is coupled with the communication interface and configured to:
process the received web content to convert a static resource request of the received web content to a dynamic resource request, wherein the dynamic resource request is intercepted and optimized by an injected client to add the replacement code in the requested web content;
determine a priority order associated with a plurality of resources of the requested web content, wherein the priority order is determined based at least in part on: the optimized dynamic resource request, a size of each of the plurality of resources, and a maximum number of concurrent connections to a server allowed by an application; and
preload the cache of an application with a plurality of resources referenced by the requested web content in a loading order specified by the determined priority order.

20. A computer program product for preloading a cache, the computer program product being embodied in a non-transitory computer readable storage medium and comprising computer instructions for:
receiving a requested web content from an edge server, wherein:
the web content includes a replacement code for requesting one of a plurality of resources,
the replacement code replaces an HTML element requesting a same one of the plurality of resources, and
at least a portion of the requested web content is obtained from a content provider via a network;
processing, by the edge server, the received web content to convert a static resource request of the received web content to a dynamic resource request, wherein the dynamic resource request is intercepted and optimized by an injected client to add the replacement code in the requested web content;
determining, by the edge server, a priority order associated with a plurality of resources of the requested web content, wherein the priority order is determined based at least in part on: the optimized dynamic resource request, a size of each of the plurality of resources, and a maximum number of concurrent connections to a server allowed by an application; and
preloading, by the edge server, the cache of an application with a plurality of resources referenced by the requested web content in a loading order specified by the determined priority order.

* * * * *